United States Patent [19]

Arlan

[11] Patent Number: 4,646,166

[45] Date of Patent: Feb. 24, 1987

[54] VIDEO STILL IMAGE STORAGE SYSTEM WITH HIGH RESOLUTION

[75] Inventor: Lionel Arlan, Middlesex County, Mass.

[73] Assignee: RCA Corporation, Princeton, N.J.

[21] Appl. No.: 634,153

[22] Filed: Jul. 25, 1984

[51] Int. Cl.[4] .............................................. H04N 9/491
[52] U.S. Cl. .................................. 358/310; 358/334
[58] Field of Search .................. 358/310, 334, 342, 12

[56] References Cited

U.S. PATENT DOCUMENTS

| 3,983,328 | 9/1976 | Newell | 178/6.8 |
| 4,373,156 | 2/1983 | Pfannkuch | 358/334 X |
| 4,553,175 | 11/1985 | Baumeister | 358/310 |
| 4,553,176 | 11/1985 | Mendrala | 358/334 |

OTHER PUBLICATIONS

IBM Technical Bulletin, vol. 9, #11, Apr. 1, 1967, pp. 1584–1585.

*Primary Examiner*—Robert L. Richardson
*Attorney, Agent, or Firm*—Joseph S. Tripoli; Allen LeRoy Limberg

[57] ABSTRACT

A video system for storing high resolution still images has a camera which produces separate video signals each representing a separate color component image. These image signals are recorded separately and during retrieval sequentially played back. Each image signal is temporarily stored and then simultaneously displayed to form a high resolution image.

8 Claims, 2 Drawing Figures

VIDEO STILL IMAGE STORAGE SYSTEM WITH HIGH RESOLUTION

The present invention relates to an apparatus for storing and retrieving color still images, and more particularly to a video system for such tasks.

BACKGROUND OF THE INVENTION

Many applications exist for the storage of a high resolution color still video image. One such application involves the storage of maps which often have line widths as small as 0.004 inches, especially when such maps are to be used for military applications. It is highly desirable from both a cost and an availability standpoint to utilize standard commercial equipment in such storage systems. However, such equipment is normally designed to record video information which conforms to conventional broadcast television standards such as those promulgated by the NTSC. Such equipment records the video as a composite color signal rather than in its individual red, green and blue color components. Although, these storage systems, such as a video disc, typically have a 3 MHz. luminance bandwidth, the chrominance bandwidth is typically limited to about 0.5 MHz. This limited chrominance bandwidth severely restricts the resolution of the still image, and is inadequate to record full color maps having very fine line widths.

SUMMARY OF THE INVENTION

A system for recording a high resolution color still video image comprises a camera capable of producing separate video signals representative of a plurality of color components of the image. Apparatus is provided for recording each of the video signals as a separate image. During playback the system simultaneously displays each of the recorded video signals on a single display device to form a composite color image.

DETAILED DESCRIPTION OF THE PREFERRED EMBODIMENTS

Figure 1:
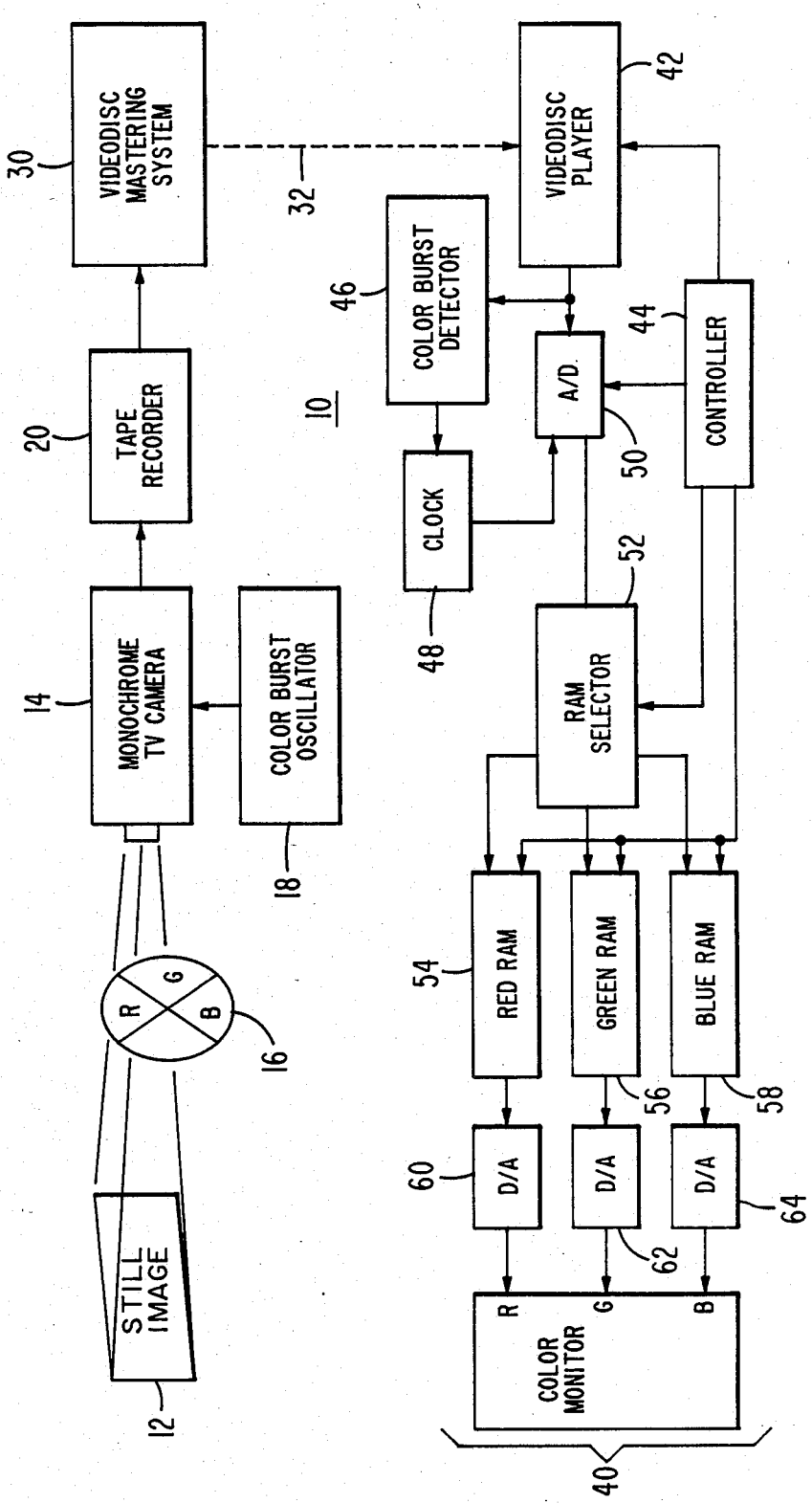
FIG. 1 is a schematic block diagram of the present video still image system.

With reference to FIG. 1 a video recording system 10, suitable for recording high resolution color still images such as image 12, has a monochrome video camera 14. The camera may be a high resolution return beam vidicon (RBV) device. The monochrome camera 14 receives a signal from a color burst oscillator 18 which may provide the conventional NTSC 3.58 MHz colorburst signal. Although typically not present in monochrome video signals, the color burst is inserted on the "back porch" of the horizontal blanking interval.

In front of the lens of the camera 14 is a dichroic filter wheel 16 having four segments. Each segment is in effect a separate filter such that one is provided for each of the red, green and blue colors of a conventional color television system; although the complements of these colors could also be used in an alternate video system. The fourth segment is clear, i.e. transmissive to white light. The filter wheel must be carefully fabricated to uniformly transmit the light so that there is no distortion of the monochromatic image transmited through one filter vis-a-vis the images transmited by the other filter segments. For example, the lens 16 may be fabricated utilizing a solid glass substrate having a flatness tolerance of one-tenth the wavelength of the color to be filtered. The major surfaces of the filter wheel 16 must be substantially parallel to one another and have a maximum wedge angle of approximately 0.5 arc-seconds.

The video output signal from the camera 14 is fed to a tape recorder 20 for temporary storage. Alternatively, a video frame store capable of storing 3 or 4 separate video images can be substituted for the tape recorder 20. The image 12 is recorded as three separate images representing red, green and blue color components. In addition, a fourth image representing a black and white video image may also be recorded for an enhanced embodiment of the present system as will be described in detail below. This recording is accomplished by successively positioning each of the four filter segments of wheel 16 in front of the lens of the camera 14 and recording a separate video image signal for each position.

Once the monochromatic image signals have been stored, the tape recording may be utilized in a video disc mastering system 30 to produce a video disc on which these images are stored. In the RCA capacitance electronic disc (CED) video disc system, four frames of video information are recorded for each revolution of the disc making it relatively easy to repeatedly play back the four component images for the color scene. The RCA video disc system also provides an interactive capability, such that identification codes, which are recorded along with the video information, may be utilized to address specific recorded frames. Other types of video disc systems, such as optical recording systems, can also be used with the present invention. During the mastering process the four separate images representing the still image 12 may be sequentially recorded on the disc. A single disc is capable of storing a large number of still images in this fashion. The transfer of the recorded images to the video disc is schematically represented by dashed line 32.

The playback portion 40 of the storage system 10 consists of a conventional interactive video disc player 42 connected to a controller 44 which among other functions addresses the particular frame or four frame segment on the video disc. The video output from the player 42 is fed to a colorburst detector 46 which recovers the 3.58 MHz. reference signal. The colorburst synchronizes a clock 48 operating at four times the colorburst frequency, or approximately 14.3 MHz. The output of the video disc player is also fed as an input to an analog-to-digital (A/D) converter 50 having a sampling rate synchronized to the 14.3 MHz. clock 48 under the control of the controller 44. A/D converter 50 digitizes the video information from the player 42 and supplies it to memory selector 52. The memory selector under the direction of controller 44 switches the digitized video to one of three random access memories (RAMs) 54, 56 or 58 for storing the red, green and blue monochromatic images respectively. Each RAM has a sufficient number of storage locations to store an image 480×780 pixels.

To display the full color image, the contents of each of the RAMs 54–58 are fed to separate digital to analog (D/A) converters 60, 62 and 64. The output from the D/A converters is in turn transmitted to the red, green and blue inputs of a high resolution RGB color video monitor 66, which combines and simultaneously displays the three separately recorded monochromatic images into a full color composite image on a single cathode ray tube.

During playback of the video disc, the player 42 is instructed to move the stylus to the portion of the groove containing the separate monochromatic images for the still image to be displayed. The frames corresponding to the red, green and blue monochromatic component images of the still image are sequentially played back by the video disc player. Each image, as it is being played back, is digitized by the analog to digital converter 50 and fed through selector 52 to be stored in the proper memory 54, 56 or 58. Once each of the three monochromatic images has been stored in the RAMs, they are read out in parallel, converted by the D/A converters 60-64 and simultaneously fed to the monitor 66 where they are displayed as a single high resolution color image. The RAMs are repeatedly read out at the video frame rate to maintain the image display.

Since the still image 12 is recorded as three separate red, green, and blue monochromatic images the full 3 MHz. luminance bandwidth of the video disc system is utilized for the information relating to each of the three colors rather than just the luminance of a composite color image such as the NTSC standard. This separate recording of the red, green and blue image components permits a relatively narrow bandwidth recording system, such as the video disc, to be utilized to record and reproduce high resolution full color images.

When critical or important still images are recorded, it is often necessary to record backup or redundant copies of the same video signals. This is typically accomplished by recording the information relating to a single still image repeatedly in the video disc groove so that a failure or defect in one of the component color image frames does not wipe out the only copy of the still image. Although this technique is entirely suitable in most applications and may be practiced with the present invention, it reduces the storage capacity of the video disc in inverse proportion to the number of backup copies stored.

In the event that only a single monochromatic frame for the still image has a defect, a black and white image stored along with the red, green and blue monochromatic images may be utilized to reconstitute the missing or defective component monochromatic image. As noted above with respect to the recording of the still image, in addition to the red, green and blue monochromatic images, a conventional black and white image consisting of essentially the luminance signal (Y) is recorded as the fourth frame of the revolution of the video disc. If any one of the three component color frames has a major error, due to stylus skipping for example, that frame can be reconstructed by differencing the two good component color frames from the Y image utilizing digital processing following readout from the RAM memories.

Figure 2:
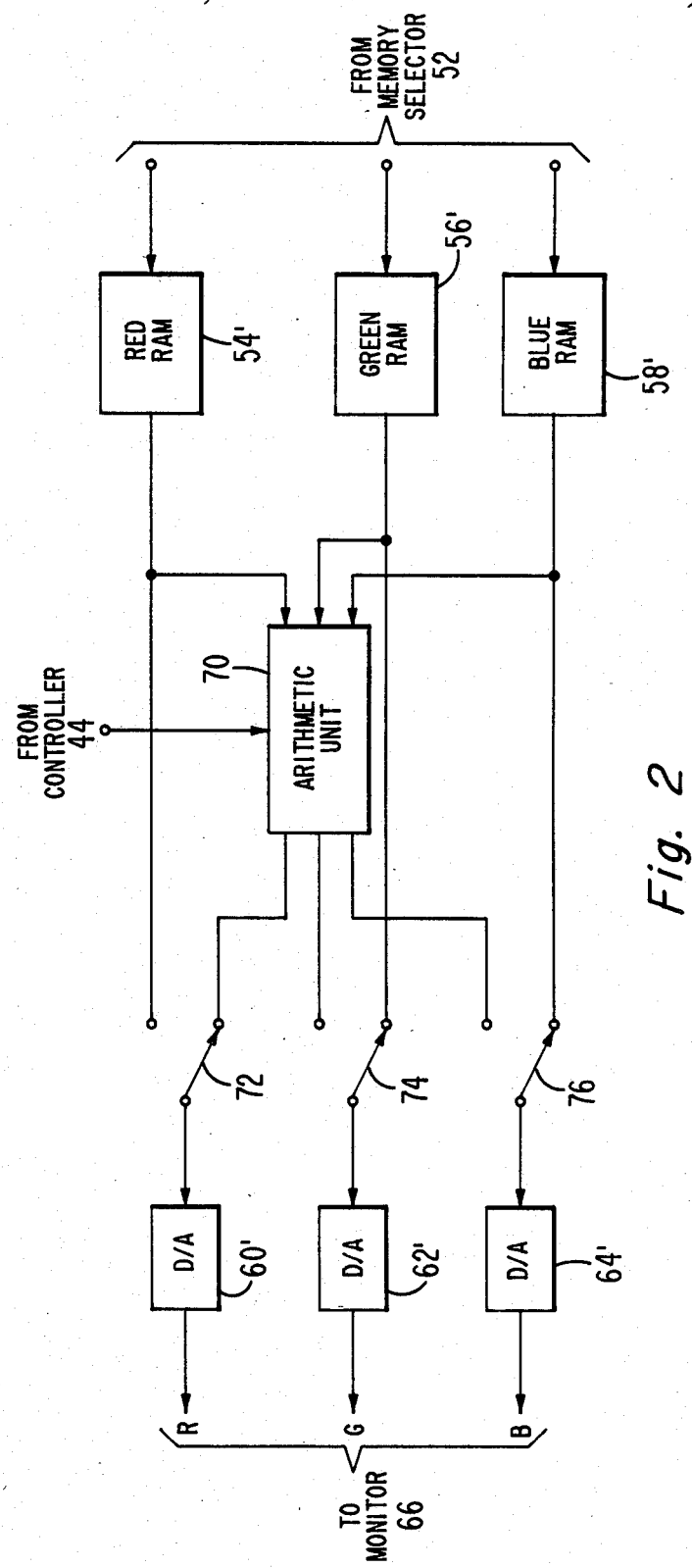
FIG. 2 is an alternate embodiment of a portion of the playback circuit for the recording system.

In this embodiment, the RAMs and digital to analog converters are configured as shown in FIG. 2. The output of each of the RAMs is fed to a arithmetic unit 70, which under the direction of the controller 44 "subtracts" two of the inputs from the third input as will be described in detail subsequently. The output of the arithmetic unit 70 is then fed to three switches 72, 74 and 76. The output of the three rams 54', 56' and 58' are also fed to the three switches 72-76. These switches independently connect the inputs of one of the D/A converters 60', 62' or 64' to either the output from one of the RAMs or the output from the arithmetic unit 70, however, only one D/A converter at a time is connected to the arithmetic unit. Each of the outputs from the D/A converters 60'-64' are connected to a different RGB input of the color monitor 66.

The arithmetic unit 70 is capable of solving the NTSC luminance equation:

$$Y = 0.59G + 0.3R + 0.11B$$

such that if the arithmetic unit is given the luminance (Y) signal and any two of the red, green or blue signals it can solve the equation for the remaining color signal. This can easily be accomplished using three conventional differencing matrices and selecting the proper one to produce the missing color signal.

For example, if the red monochromatic image stored on the video disc contains an error, the luminance or black and white image information is fed from the player 42 to the red RAM 54'. The controller 44 sets the switches 72, 74 and 76 and shown in FIG. 2 so that the green and blue signals from the RAMs 56' and 58' are fed directly to their respective D/A converters 62' and 64'. The red D/A converter 60' has its input connected to the output of the arithmetic unit 70. In this case, the luminance video is fed from the red RAM into the arithmetic unit along with the green and blue video. The arithmetic unit 70 solves the luminance equation to produce a red video signal which is fed to the red D/A converter 60' and to the red input of the color monitor 66. In this manner instead of recording at least three redundant frames of monochromatic images, a single black and white or luminance image may be utilized to derive a red, green or blue monochromatic signal. Thus, this variation on the basic system reduces the amount of space required on the video disc for redundancy.

I claim:

1. In combination:

apparatus for supplying video signals having serial-in-time segments cyclically descriptive of first, second and third color component image fields, each segment comprising a succession of digitized pixel values;

first, second and third random-access memories, each having respective storage locations sufficient in number to store the pixels of any image field;

means for writing the successive digitized pixel values of the video signal segment descriptive of said first color component image field into said first random-access memory;

means for writing the successive digitized pixel values of the video signal segment descriptive of said second color component image field into said second random-access memory;

means for writing the successive digitized pixel values of the video signal segment descriptive of said third color component image field into said third random-access memory;

means for repeatedly field scanning the storage locations of said first, second and third random-access memories parallelly-in-time to supply respective read-outs;

means for converting the read-outs of said first, second and third random-access memories to red, green and blue video signals.

2. A combination as set forth in claim 1 wherein said apparatus for supplying video signals provides them by playing back from a recording, which playing back is subject to some time base variation.

3. A combination as set forth in claim 1 wherein said first, second and third color components are red, green and blue components respectively.

4. A combination as set forth in claim 1 wherein said first, second and third color components are red, green and luminance components respectively.

5. A combination as set forth in claim 1 wherein said first, second and third color components are red, blue and luminance components respectively.

6. A combination as set forth in claim 1 wherein said first, second and third color components are green, blue and luminance components respectively.

7. In combination:
apparatus for supplying video signals having serial-in-time segments cyclically descriptive of first, second, third and fourth color component image fields, each segment comprising a succession of digitized pixel values, one of said color component fields being a weighted summation of the other color component fields;

first, second and third random-access memories, each having respective storage locations sufficient in number to store the pixels of any image field;

means for writing the successive digitized pixel values of three selected ones of the four video signal segments into said first random-access memory, into said second random-access memory, and into said third random-access memory, respectively;

means for repeatedly field scanning the storage locations of said first, second and third random-access memories parallelly-in-time to supply respective read-outs;

means for converting the read-outs of said first, second and third random-access memories to red, green and blue video signals.

8. A combination as set forth in claim 7 wherein said apparatus for supplying video signals provides them by playing back from a recording, which playing back is subject to some time base variation.

* * * * *